United States Patent
Felter

(10) Patent No.: US 6,293,388 B1
(45) Date of Patent: Sep. 25, 2001

(54) TROLLEY RETENTION ABUTMENT FOR OVERHEAD CONVEYING SYSTEM

(75) Inventor: Christopher L. Felter, Mason, OH (US)

(73) Assignee: OCS - Intellitrak, Inc., Cincinnati, OH (US)

( * ) Notice: Subject to any disclaimer, the term of this patent is extended or adjusted under 35 U.S.C. 154(b) by 0 days.

(21) Appl. No.: 09/305,475

(22) Filed: May 6, 1999

(51) Int. Cl.[7] .................................................. B61B 3/00
(52) U.S. Cl. ........................ 198/465.4; 198/530; 104/166
(58) Field of Search .............................. 198/465.4, 530, 198/687.1; 104/166

(56) References Cited

U.S. PATENT DOCUMENTS

| | | |
|---|---|---|
| 3,164,104 | 1/1965 | Hunt . |
| 3,584,726 * | 6/1971 | Hartzell ................................ 198/530 |
| 3,850,280 | 11/1974 | Ohrnell . |
| 3,999,684 * | 12/1976 | Ekholm ................................ 198/530 |
| 4,203,511 | 5/1980 | Uhing . |
| 5,072,822 * | 12/1991 | Smith ................................ 198/465.4 |
| 5,785,168 | 7/1998 | Beall, Jr. . |
| 5,806,655 | 9/1998 | Tabler . |

* cited by examiner

Primary Examiner—Christopher P. Ellis
Assistant Examiner—Mark A. Deuble
(74) Attorney, Agent, or Firm—Thomas E. Beall, Jr.

(57) ABSTRACT

Overhead conveying system trolleys supported by canted driven rollers engage on and form spiral loci of engagement with a rotated drive shaft in a powered section, and each has a top wheel used to lift the driven rollers off of the drive shaft as the trolley enters a gravity rail section where the wheel is supported on a rail and where a step feeder releases trolleys one at a time from or along the gravity rail section. A pivoted step feeder arm in a receiving and holding position receives the wheel of the lead trolley, which actuates a release limit switch, to cause the arm to rotate and release the trolley. In this release position, the retention abutment mounted on the accumulation side of the arm, prevents any following trolley from actuating the release limit switch. The arm remains in the release position until a second limit switch is actuated by the released trolley moving away, to cause the arm to rotate to the receiving and holding position to receive the next lead trolley. The retention abutment has a cam that will engage and force back the following trolley while the arm rotates into the release position and thereby keep the following trolley from swinging and actuating the release limit switch while the gravity line is exposed to significant back pressure from accumulated trolleys.

7 Claims, 2 Drawing Sheets

TROLLEY RETENTION ABUTMENT FOR OVERHEAD CONVEYING SYSTEM

BACKGROUND OF THE INVENTION

The present invention relates to mixed powered and gravity feed overhead conveyers, which have a gravity rail section for accumulation, re-timing, workstation waiting, buffers and the like, and a suspended trolley step feeder on the gravity rail conveyer section.

As a specific powered overhead conveyor system and for specific trolleys that have a gravity rail engaging top wheel that are conventionally used in combination with a step feeder, reference is made to the following patents, whose disclosure is incorporated herein in their entirety by reference: U.S. Pat. No. 5,806,655 issued Sep. 15, 1998 to Tabler; U.S. Pat. No. 5,785,168 issued Jul. 28, 1998 to Beall Jr.: U.S. Pat. No. 4,203,511 issued May 20, 1980 to Uhing; U.S. Pat. No. 3,164,104 issued Jan. 5, 1965 to Hunt; and U.S. Pat. No. 3,850,280 issued Nov. 36, 1974 to Ohrnell.

Gravity rail conveyors are well known and generally much lighter in construction. Usually, a trolley is supported by a top wheel riding on a rail and suspending the load from the trolley, by a carriage. The trolleys, being light even when loaded may be manually pushed along the rail.

Being powered, conveyer systems of the above type can handle loads that commonly range to over one hundred pounds each, and the step feeder needs to have a substantial stop to hold upstream accumulated trolleys in line on a gravity section while the lead trolley is released. Transfer devices are known to automatically move a loaded trolley between the powered and gravity sections, and such transfer may be accomplished manually also.

SUMMARY OF THE INVENTION

Due to the conveyor system being a mixed system of powered and gravity conveyors, the trolleys are heavier than they would be in a dedicated gravity system and carry far heavier loads, so that the inventor has noticed a problem that the front trolley in a line of abutting trolleys in, e.g. an accumulator, will swing forward about its top wheel axis and has a tendency to abnormally actuate a release switch of a step feeder when such actuation should not occur, which can cause operational problems.

An analysis of this problem by the inventor has led to consideration of one possible solution, which was rejected and led to the present embodiment. The rejected solution necessitated relatively complicated and expensive structure (relative to the simple and inexpensive structure of a lightweight solely gravity conveyer for light loads). This rejected solution to this gravity section step feeder problem would entail two separate trolley retaining abutments on two separate step feeder arms and two separate actuators, one actuator to release the lead trolley and one actuator to hold the remaining trolleys far enough upstream in the line to prevent the following trolley from swinging into the release limit switch when the lead trolley has departed. With two actuators, controls would be needed to coordinate the operation of the actuators, thus requiring the controlled release of one following trolley by the upstream step feeder arm at a time to the downstream step feeder.

Although there would be no requirement for additional limit switches, this another step feeder arm and the necessary controls for it's integration is readily seen to greatly increase the initial expense, installation cost and complexity of controls as compared to the use of a single step feeder arm that may be all that is needed on a simple lightweight solely gravity rail conveyor system.

This gravity section step feeder operation problem is caused by the relatively large amount of backpressure caused by empty or heavily loaded trolleys that also operate on the powered section, as analyzed by the inventor and which analysis is part of the present invention.

With the weight handled by the trolleys of a powered conveyer, there can be substantial forces on the step feeder in the gravity rail section that require a substantial actuator and dog or the like for each function of 1) holding and selectively releasing of the lead trolley, and 2) holding and selectively releasing of the second and subsequent trolleys that have accumulated in line. Sensors, controls and actuators, usually electrical and fluid are needed and must be timed to synchronize and coordinate the above two functions. The second function can involve widely varying forces, depending upon the loads on the trolleys and the number of trolleys being held in line. Problems encountered by a step feeder of a gravity rail section that handles relatively large and heavily loaded trolleys of a mixed power and gravity conveyor system are far more severe than typically encountered in a relatively lightweight dedicated gravity conveyor.

By way of a specific example and as the best mode of carrying out the invention, the step feeder having the new trolley retention mechanism is in combination with a gravity accumulation buffer as one of many different types of gravity systems throughout the overall mixed conveyor system.

In the powered portions of the conveyor system, a horizontal rotating drive shaft is engaged on it's top periphery by skewed or canted driven rollers/wheels that will each track a spiral line of contact with the rotating shaft as the rollers move the trolley on which they are mounted axially along the drive shaft in a direction depending upon the direction of skew and the direction of rotation of the drive shaft.

Each trolley has an upper or top single wheel/roller that is freely mounted for rotation about an axis perpendicular to the drive shaft axis and mounted above the driven rollers. The wheel may be selectively engaged and lifted to disengage the driven rollers from the drive shaft as the wheel is moved to a gravity rail of a gravity rail conveyor section, which in the example is an accumulation buffer. Herein wheels and rollers are generally equivalent and interchangeable terms, with different terms being used merely to denote association with different uses for specific ones of the structures, namely wheels for the gravity section and rollers for the powered section.

The step feeder of the present invention is placed on (used herein broadly, because such is equivalent to operatively adjacent to) a gravity line or section. The step feeder has a retention abutment, the retention abutment has an operation as follows:

1) In a normal receiving state, a pivoted step feeder arm will be in a position to receive and hold the top gravity wheel of the lead trolley.
2) When a trolley body of the lead trolley actuates a release limit switch indicating that the lead trolley has been received by and is being held by the pivoted step feeder arm, the release limit switch provides a release signal that causes (solely or in combination with other trolley position signals, a time out signal for a delay, a command signal from a controller, or the like signals for other purposes) actuation of one side of a double solenoid valve (as a specific example of one of many types of actuators that may be used) and which in turn causes the step feeder arm to rotate to a release position to release the lead trolley. While in this release position, the abutment mounted on the accumulation side of the step feeder arm, prevents any following trolley from actuating the release limit switch.

3) The step feeder arm will remain in the release position until a second limit switch, which may be mounted on either an in-feeder non-powered rail (for a double trolley carrier) or the out-feeder side such as the powered line (for a single trolley carrier), is actuated by the trailing trolley (for a double trolley carrier) or single following trolley (for a single trolley carrier). When this happens a signal is transmitted to actuate (again by itself or in combination with other signals) the other side of the solenoid valve and thereby causing the step feeder arm to rotate to the receiving and holding position where the step feeder arm is ready to receive the next lead trolley, which was formerly the following trolley.

Two significant advantages of the abutment, which is more preferably a cam shaped retention abutment attached to the step feeder arm, are: 1) to smoothly engage and force back the following trolley top gravity wheel while the step feeder arm rotates into the release position, and 2) to keep the following trolley from actuating the release limit switch while the accumulation buffer is exposed to significant back pressure from subsequent trolleys in line in the accumulation buffer.

BRIEF DESCRIPTION OF THE DRAWING

Further objects, features and advantages of the present invention will become more clear from the following detailed description of a preferred embodiment, with reference to the accompanying drawing, wherein:

FIG. 3 is an elevational view of only the feeder arm, taken perpendicular to its illustration in FIG. 1, with the feeder arm in the release position; and FIG. 4 is an elevational view similar to FIG. 3, but with the feeder arm in the receiving and holding position.

DETAILED DESCRIPTION OF THE INVENTION

Figure 1:
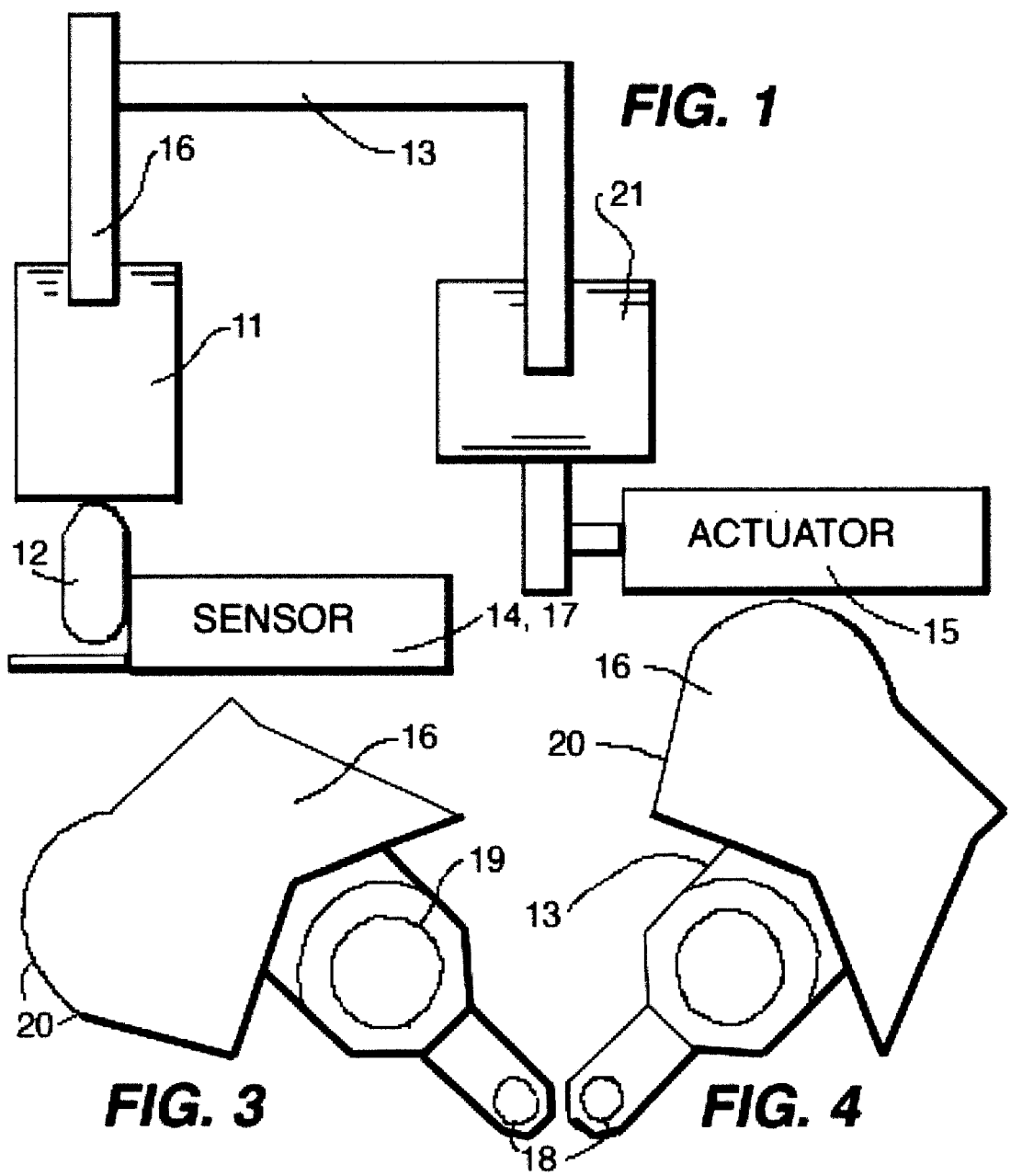
FIG. 1 is a view on a plane perpendicular to the conveying path of the gravity rail section of the conveyor system.

The powered overhead conveyor system of the present may extend between picking or loading stations of a distribution system, work stations of an assembly plant, processing stations (for example, spraying and drying of a process plant) and the like, as examples of a multi-station environment that would have need for both powered and gravity rail sections of an overhead conveyor. The system includes at least one powered section 3 of FIG. 2 and at least one gravity section of FIG. 1.

In the powered section 3 a stationary frame 4 would include a ceiling or floor and beam structure for rotationally supporting a drive shaft 5 having a top surface portion for engaging and driving a trolley 6 that supports a load 7. A drive module 8 rotatably drives the shaft 5 about its axis to move the trolleys 6 along the length of the shaft 5, which length extends in the direction of the conveying path.

Figure 2:
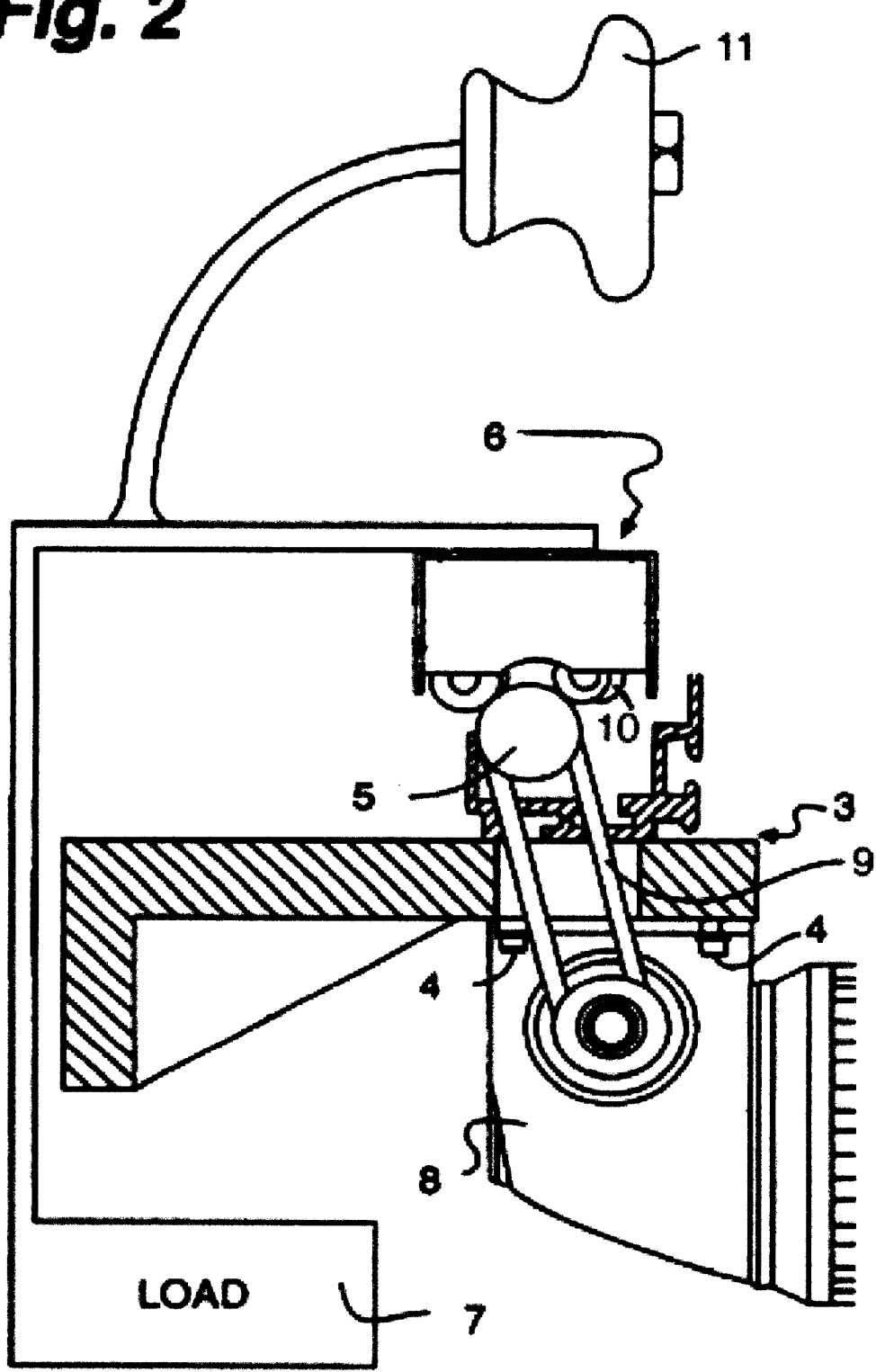
FIG. 2 is a view on a plane perpendicular to the conveying path of the powered section of the conveyor system, with much of the conventional trolley shown schematically.

In FIG. 2, the conventional drive module 8, which includes and electric motor and a worm gear transmission, e.g., is drivingly coupled to the drive shaft 5 by a belt drive 9 to rotate the drive shaft 5. A detailed description of the illustrated powered section 2, which is conventional, is in the above-mentioned patents.

To convert the rotary motion of the shaft 5, extending along the conveying path, into a linear motion, at least one or two and most preferably four driven rollers 10 engage the topmost periphery or free periphery of the drive shaft 5. Each of these driven rollers 10 is mounted for rotation on the trolley 6 about an axis that is non-parallel to the axis of the drive shaft 5 and non-perpendicular to the axis of the drive shaft 5, preferably being at an acute angle thereto; the angle being selected according to the desired linear speed and linear force along the conveying path. Thereby, when the drive shaft 5 rotates, the driven rollers 10 engage the drive shaft 5 to form a helical loci of engagement about the periphery of the drive shaft 5 so as to linearly power the driven rollers 10 along the conveying path in a conveying direction that depends upon the direction of rotation of the drive shaft 5, in a manner analogous to a worm gear or threaded type engagement.

As previously mentioned, the overhead conveyor system has a gravity section, shown in FIG. 1, and as an example, this may be a trolley accumulation buffer as one of many different types of gravity rail conveyor systems throughout the overall conveyor system.

Each trolley 6 has mounted thereon an upper or top single wheel 11, which freely rotates about an axis perpendicular to the drive shaft axis and above the driven rollers 10. The wheel 11 may be selectively engaged by the above-mentioned transfer mechanism or manually and lifted to disengage the driven rollers 10 from the drive shaft 5 as the wheel 11 is moved to a gravity rail 12 of the gravity section shown in FIG. 1.

In a normal receiving state as shown in FIG. 4, a pivoted step feeder arm 13 will be in a position to receive and hold the top gravity wheel 11 of the lead trolley. The pivoted step feeder arm 13 is pivotally mounted by a tubular bearing 19 about a fixed pivot axis, which axis is at right angles to the conveying path.

When a trolley body of the lead trolley 6 actuates a release sensor 14, which is located to be engaged by the lead trolley 6 in a position wherein its wheel 11 engages the upstream facing edge of the downstream (right hand in the drawing) leg of an escapement type dog 16, indicating that the lead trolley 6 has been received by and is being held by the pivoted step feeder arm 13, the release sensor 14 provides a release signal that causes actuation of an actuator, e.g. activation of one side of a double solenoid actuator 15, and which in turn causes the step feeder arm 13 to rotate to a release position, shown in FIG. 3, to release the lead trolley 6. The actuator 15 pivots the feeder arm 13 about the concentric axis of the bearing 19 of a tubular portion 21 by engaging a crank bearing 18. While in this release position, the escapement dog 16 mounted on the accumulation side of the step feeder arm, prevents any following trolley 6 (to the left or upstream of the lead trolley) from actuating the release sensor 14.

The step feeder arm 13 will remain in the release position of FIG. 3 until actuation of a second sensor 17, which may be mounted on either an in-feeder non-powered rail (for a double trolley carrier) or the powered line (for a single trolley carrier), is actuated by the trailing trolley (for a double trolley carrier) or single following trolley. In the illustrated example of a single trolley carrier, the second sensor 17 is downstream of the release sensor 14 so as to be actuated by the lead trolley 6 after the lead trolley is released by the feeder arm. When this happens a signal is transmitted by the sensor 17 to directly actuate or actuate through a controller the actuator 15, e.g. energize the other side of the double solenoid actuator 15, and the step feeder arm 13 then rotates to the receiving and holding position of FIG. 4 to receive the following trolley 6 that thereby will become the next lead trolley 6.

The escapement dog 16 is above and vertically aligned with the gravity rail 12. The wheel 11 is shown as cylindrical in FIG. 1, although it is preferably of a shape as shown in FIG. 2. The dog 16 has a downstream leg The right hand depending V-shaped portion, which engages with the downstream portion of the wheel 11 of the lead trolley 6 in the receiving and holding position of FIG. 4. In the release position of FIG. 3, the downstream leg is clear of the path of travel of the wheel 11 of the lead trolley 6 moving downstream. The dog 16 further has an upstream leg that engages with the downstream portion of the wheel 11 of the following trolley 6 in the release position of FIG. 3 and is clear of the path of travel of the wheel 11 of the following trolley 6 moving downstream to become the next lead trolley 6 in the receiving and holding position of the pivot arm 13 as shown in FIG. 4.

Thereby the release sensor 14 will normally sense a lead trolley 6 on the gravity rail 12 in the release position when the pivot arm 13 is in the receiving and holding position, and in response thereto provide a release signal.

The following specific problem is unique to a mixed powered and gravity overhead conveyor system, as previously broadly discussed, and now the problem will be discussed in more detail. The release sensor 14 is mounted at a position in the path of the trolleys 6 below the gravity rail 12 and thus at a substantial radial distance from the axis of rotation of the wheel 11 of the following trolley 6, which axis of rotation is also the axis of swinging of the following trolley 6. The release sensor 14 mounted position is such that it would abnormally sense the following trolley 6 as the following trolley 6 normally swings about its wheel 11 axis of rotation due to pressure from further upstream trolleys 6 engaging it if there was no lead trolley 6 in the release position to prevent such swinging and if the following trolley 6 did not move upstream a sufficient distance when the pivot arm 13 is pivoted from the receiving and holding position to the release position. However, the present invention avoids such a situation.

The actuator 15, when actuated by an actuator signal that is dependent upon the release signal, pivots the pivot arm 13 including the escapement dog 16 about the pivot axis of bearing 19 from the receiving and holding position of FIG. 4 to the release position of FIG. 3. The escapement dog 16, on its upstream or left hand leg in the drawing, has a cam shaped abutment 20 on its upstream edge to engage and force back at least the above-mentioned sufficient distance, in a direction counter to the conveying direction, the following trolley 6 while the pivot arm 13 rotates from the receiving and holding position of FIG. 4 into the release position of FIG. 3, and thereby prevent the following trolley 6 from actuating the release sensor 14 during the above-mentioned normal swinging while the gravity line is exposed to significant back pressure from subsequent trolleys 6.

This sufficient distance is determined on a case by case basis and is dependent upon many factors, such as 1) the radial distance from the axis of the wheel 11 of the following trolley 6, the swing axis, and the sensing position of the sensor 14, 2) the effective weight and radius of the loaded following trolley, its moment of inertia, 3) the friction of swinging, probably negligible, 4) the back pressure of or momentum of trolleys in line upstream of the following trolley, and the like; therefore due to the complexity of the factors believed to be involved by the inventor, it is practically impossible to more specifically define and best determined experimentally on a case by case basis. Such experimentation is not a big problem, because it is common to construct a prototype of each system during the design stage, which is unique for each such mixed system, to test all of the components to the desired unique specifications, and at that time it is a simple matter to find such sufficient distance. Such large mixed powered and gravity overhead conveyor systems of the present invention are not off the shelf products and require considerable engineering and testing for each new installation.

The step feeder may, but not necessarily does, include a controller, which may then be a part of the actuator, that is connected to the release sensor 14 to receive the release signal in responsive to a lead trolley 6 actuating the release sensor 14, and, in response to the release signal, issue the actuator signal to the actuator 15 to thereby cause the actuator 15 to rotate the pivot arm 13 from the receiving and holding position of FIG. 4 to the release position of FIG. 3 and to thereby release the lead trolley 6 to move in the conveying direction along the conveying path.

The second sensor 17 is mounted to engage the released trolley at a position downstream from the position of the lead trolley 6 at the time of release and thereby be actuated by the released trolley that has moved in the conveying direction a distance from the pivot arm 13 to be free of interference with rotation of the pivot arm 13, to produce a trolley free signal. The controller is connected to the second sensor 17 to receive the trolley free signal in responsive to a released one of the trolleys 6 actuating the second sensor 17, and thereby, in response to the trolley free signal, issue a second actuator signal to the actuator 15 to thereby cause the actuator 15 to rotate the pivot arm 13 from the release position of FIG. 3 to the receiving and holding position of FIG. 4, to receive the following trolley 6, which then moves forward by gravity to become the next lead trolley 6. The controller could also logically AND the signals of the sensors 14,17 with other signal, for example a demand command, a delay signal, or an event driven signal.

Each of the release sensor 14 and the second sensor 17 is preferably a limit switch, but could be some other type of a sensor, e.g. an optical sensor, a capacitance proximity sensor, or the like. The actuator 15 may be a double solenoid linear actuator, preferably, or may be any suitable type actuator, for example a double piston air chamber linear actuator or a rotary step motor.

The actuator 15 normally holds the pivot arm 13 in the receiving and holding position of FIG. 4, including in the absence of the release signal and in the absence of the trolley free signal, so that when there is no lead trolley 6, there is also no following trolley 6 and the next trolley 6 moving into the step feeder will move directly to the position to be the lead trolley 6.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

What is claimed is:

1. An overhead conveyor system, comprising:

a plurality of trolleys for suspending loads;

an overhead powered conveyor for suspending said trolleys and transporting said trolleys serially in a conveying direction along at least one powered conveying path;

said overhead powered conveyor having at least one drive having a rotational power output, cylindrical drive shafts mounted for rotation about respective shaft axes parallel to respective portions of said conveying path, and a power connection between said drive power output and said drive shafts for driving said drive shafts about said shaft axes, respectively;

said trolleys each having a skewed driven wheel mounted for rotation about a driven wheel axis nonparallel and non-perpendicular to a corresponding one of said shaft axes, and said driven rollers engaging a top portion of said drive shafts with sufficient traction so as to form a helical loci of engagement about the periphery of said drive shafts during rotation of said drive shafts about said shaft axis to power said trolleys along the conveying path in the direction of the powered conveying path dependent upon a direction of rotation of said drive shafts and the skew of said rollers;

said trolleys suspending the loads vertically below said drive shafts;

an overhead gravity line conveyor having a gravity rail for suspending said trolleys and transporting said trolleys serially along at least one gravity line conveying path that is operatively adjacent a powered conveying path to form together a mixed powered and gravity rail conveyor;

each of said trolleys having a gravity wheel to engage with said gravity rail to support respective ones of said trolleys on said gravity line conveyor with said driven rollers disengaged from said drive shaft;

said overhead gravity line conveyor having a step feeder mounted adjacent said gravity rail, said step feeder having a pivot arm that is pivotally mounted about a pivot axis at right angles to the conveying path for pivotal movement between a gravity wheel receiving and holding position that engages and thereby prevents a wheel of a lead trolley on said gravity rail from continuing in the conveying direction along the conveying path, and a release position that is free of said lead trolley in the conveying direction to thereby permit said lead trolley to continue in the conveying direction along the conveying path;

said pivot arm having an escapement dog above and vertically aligned with said rail, said dog having a downstream leg that engages with the downstream portion of said wheel of said lead trolley in the receiving and holding position and is clear of the path of travel of said wheel of said lead trolley moving downstream in the release position of said pivot arm, and an upstream leg that engages with the downstream portion of said wheel of said following trolley in the release position and is clear of the path of travel of said wheel of said following trolley moving downstream to become said next lead trolley in the receiving and holding position of said pivot arm;

said step feeder further having a release sensor mounted at a switch position in the path of said trolleys below said gravity rail and thus at a substantial radial distance from said axis of rotation of said wheel of both said lead trolley and said following trolley, which axis of rotation is also said axis of swinging of the respective one of said trolleys, thereby to normally sense a lead trolley on said gravity rail in the release position when said pivot arm is in the receiving and holding position, and in response thereto provide a release signal;

said release sensor mounted position being such that it would abnormally sense said following trolley as it normally swings about its wheel axis of rotation due to pressure from further upstream trolleys engaging if there was no lead trolley in the release position to prevent such swinging and if said following trolley did not move upstream a sufficient distance when said pivot arm is pivoted from the receiving and holding position to the release position;

said step feeder further having an actuator engaging said pivot arm to thereby, when actuated by an actuator signal that is dependent upon the release signal, pivot said pivot arm including said dog about the pivot axis from the receiving and holding position to the release position, to thereby release lead ones of said trolleys one at a time along the conveying path in dependence upon the actuator signal; and said escapement dog having a cam shaped retention abutment to engage and force back at least said sufficient distance in a direction counter to the conveying direction said following trolley while said pivot arm rotates from the receiving and holding position into the release position, and thereby prevent said following trolley from actuating said release sensor during the normal swinging while said gravity line is exposed to significant back pressure from subsequent trolleys.

2. The conveyor system of claim 1, wherein said step feeder includes a controller that is connected to said release sensor to receive the release signal in responsive to a lead one of said trolleys actuating said release sensor, and, in response to the release signal, issue the actuator signal to said actuator to thereby cause said actuator to rotate said pivot arm from said receiving and holding position to said release position and to thereby release said lead trolley to move in the conveying direction along the conveying path.

3. The conveyor system of claim 2, wherein said step feeder further includes a second sensor mounted to engage said released trolley at a position downstream from the position of said lead trolley at the time of release from said step feeder and thereby be actuated by said released trolley that has moved in the conveying direction a distance from said pivot arm to be free of interference with rotation of said pivot arm to produce a trolley free signal; and wherein said controller is connected to said second sensor to receive the trolley free signal in responsive to a released one of said trolleys actuating said second sensor, and thereby, in response to the trolley free signal, issue a second actuator signal to said actuator to thereby cause said actuator to rotate said pivot arm from the release position to the receiving and holding position to receive said following trolley, which thereby becomes said next lead trolley.

4. The conveyor system of claim 3, wherein each of said release sensor and said second sensor is a limit switch.

5. The conveyor system of claim 3, wherein said actuator normally holds said pivot arm in the receiving and holding position, including in the absence of the release signal and in the absence of the trolley free signal, so that when there is no lead trolley there is also no following trolley and the next trolley moving into the step feeder will move directly to the lead trolley position.

6. The conveyor system of claim 2, wherein said actuator normally holds said pivot arm in the receiving and holding position, including in the absence of the release signal and in the absence of the trolley free signal, so that when there is no lead trolley there is also no following trolley and the next trolley moving into the step feeder will move directly to the lead trolley position.

7. The conveyor system of claim 1, wherein said actuator normally holds said pivot arm in the receiving and holding position, including in the absence of the release signal and in the absence of the trolley free signal, so that when there is no lead trolley there is also no following trolley and the next trolley moving into said step feeder will move directly to the lead trolley position.

* * * * *